US011853708B1

(12) United States Patent
Connor

(10) Patent No.: US 11,853,708 B1
(45) Date of Patent: Dec. 26, 2023

(54) DETECTING AI-GENERATED TEXT BY MEASURING THE ASSERTED AUTHOR'S UNDERSTANDING OF SELECTED WORDS AND/OR PHRASES IN THE TEXT

(71) Applicant: Robert A. Connor, St. Paul, MN (US)

(72) Inventor: Robert A. Connor, St. Paul, MN (US)

(73) Assignee: Holovisions LLC, St. Paul, MN (US)

( * ) Notice: Subject to any disclaimer, the term of this patent is extended or adjusted under 35 U.S.C. 154(b) by 0 days.

(21) Appl. No.: 18/195,886

(22) Filed: May 10, 2023

(51) Int. Cl.
  *G06F 40/40* (2020.01)
  *G06F 16/383* (2019.01)

(52) U.S. Cl.
  CPC ............ *G06F 40/40* (2020.01); *G06F 16/383* (2019.01)

(58) Field of Classification Search
  CPC ...... G06F 40/40; G06F 40/186; G06F 40/279; G06F 40/30; G06F 40/35; G06F 40/56; G06F 9/451; G06F 16/383; G06F 40/211; G06F 40/295; G06F 40/20; G06F 11/302; G06F 11/3419; G06F 11/3664; G06F 11/3688; G06F 16/2228; G06F 16/288; G06F 16/3329; G06F 16/367; G06F 16/9024; G06F 16/90332; G06F 3/0481; G06F 40/169; G06F 40/284; G06F 9/54; G06F 16/22; G06F 16/245; G06F 16/316; G06F 16/3331; G06F 16/35; G06F 16/637; G06F 16/685; G06F 16/686; G06F 16/687; G06F 16/9536; G06F 18/254; G06F 21/6245; G06F 40/117; G06F 40/205; G06F 40/253; G06F 40/289; G06F 8/33; G06F 9/45512; G10L 15/26; G10L 13/033; G10L 15/005; G10L 17/26; G10L 25/57; G10L 25/63
See application file for complete search history.

(56) References Cited

U.S. PATENT DOCUMENTS

| | | | | |
|---|---|---|---|---|
| 8,577,898 B2* | 11/2013 | Al Badrashiny | ..... | G06F 40/232 434/156 |
| 8,615,529 B2* | 12/2013 | Reiner | ................. | G06F 40/253 707/790 |
| 2019/0236146 A1* | 8/2019 | Niekrasz | ................. | G06F 40/30 |
| 2021/0004540 A1* | 1/2021 | Harper | .................... | G06F 40/30 |
| 2022/0292127 A1* | 9/2022 | Sakamoto | ............. | G06F 40/279 |
| 2023/0169884 A1* | 6/2023 | Tan | ......................... | G06F 40/58 434/157 |

FOREIGN PATENT DOCUMENTS

JP    5870790    *   3/2016   ........... G06F 40/129

OTHER PUBLICATIONS

M Sahu "Plagiarism detection using artificial intelligence technique in multiple files", International Journal of Scientific and Technology . . . , 2016—academia.edu (Year: 2016).*

Gao et al. "Comparing scientific abstracts generated by ChatGPT to original abstracts using an artificial intelligence output detector, plagiarism detector, and blinded human reviewers", BioRxiv, 2022—biorxiv.org (Year: 2022).*

* cited by examiner

*Primary Examiner* — Abdelali Serrou

(57) ABSTRACT

This invention is a method for detecting AI-written material which evaluates authorship more directly than purely machine-based methods of AI detection. This method automatically selects relatively-rare key words and/or phrases used in a submitted body of text which is asserted to have been written by a specific person and creates a test to measure understanding of those key words and/or phrases which is administered to that person.

1 Claim, 1 Drawing Sheet

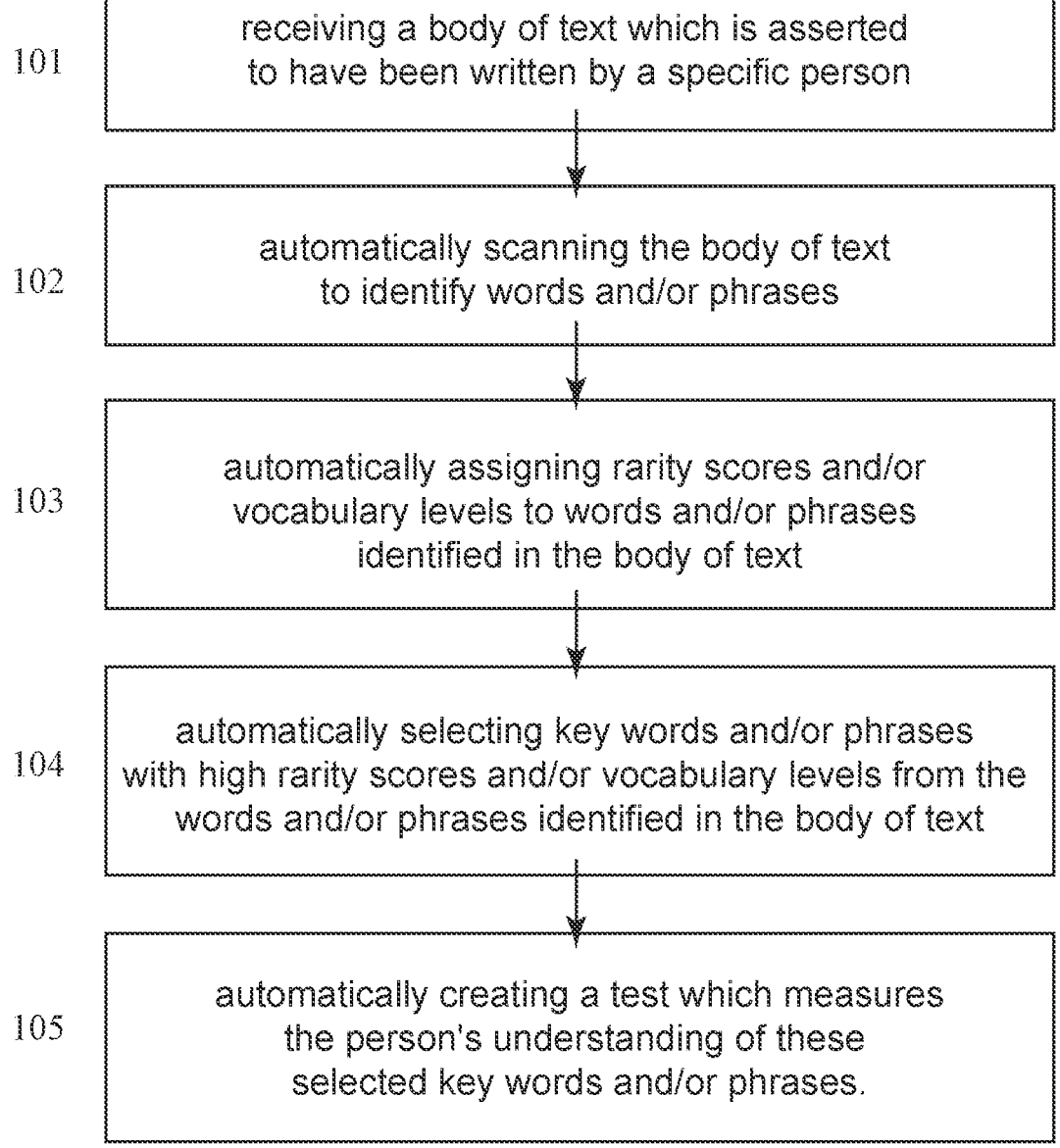

:

DETECTING AI-GENERATED TEXT BY MEASURING THE ASSERTED AUTHOR'S UNDERSTANDING OF SELECTED WORDS AND/OR PHRASES IN THE TEXT

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

Field of Invention

This invention relates to methods for detecting AI-written material.

INTRODUCTION

Recent advances in the ability of Artificial Intelligence (AI) to compose written material in response to prompts have made it more difficult to determine whether written material has been written by a person or written by AI. This is starting to affect several areas of communication, including submission of written assignments by students in an educational context. It is getting harder for teachers to detect whether material was written by AI. False positives (e.g. thinking that material was written by AI when it was really written by the student) can result in unfair penalties and/or damage trust between a student and a teacher. False negatives (e.g. thinking that material was written by a student when it was really written by AI) can result in unfair academic rewards and/or undermine the student's actual educational progress.

REVIEW OF THE RELEVANT ART

In response to the challenges of improved AI composition of written material, there are several efforts underway to create machine-based methods to automatically analyze written material and evaluate whether it has been written by AI.

However, detection of material composed by AI is much more fluid and challenging than detection of traditional plagiarism. The ability of AI to compose written material is evolving very rapidly. AI detection methods can become rapidly and/or intermittently obsolete unless they continually evolve to stay one step ahead of AI composition capabilities. Some methods use AI to detect AI. This can turn into a "battle of the bots" which increasingly leaves humans out of the loop. For example, when purely machine-based methods are used to detect AI written assignments in an educational context, this can erode the beneficial and educational interaction between student and teacher. More innovative and human-engaging methods of AI material detection are needed so that education does sink into a mindless "battle of the bots."

SUMMARY OF THE INVENTION

This invention provides a method for detection of AI-written material which intentionally keeps humans (e.g. students and teachers) in the loop. Although this method includes some automation, it keeps humans in the loop and evaluates authorship more directly than is possible with purely machine-based methods of AI detection. This method decreases the chances of education devolving into a "battle of the bots" which erodes the value of education. The central concept of this method is that someone who writes something should understand the meanings of the words and/or phrases used in it. The less a person who submits written material understands the meanings of words and/or phrases in that material, the greater the probability that this person did not actually write the material. More specifically, this method uses scores for word (or phrase) rarity and/or vocabulary level to select key words and/or phrases from a submitted body of text, wherein these key words and/or phrases are then incorporated into a test of understanding which is administered to the asserted author of the text.

In an example, this invention can be an automated method (e.g. a method implemented via a computer software and/or program) for detecting AI-generated content in text asserted to have been written by a specific person which includes: (a) receiving a body of text which is asserted to have been written by a specific person; (b) automatically scanning the body of text to identify words and/or phrases; (c) automatically assigning rarity scores and/or vocabulary levels to words and/or phrases identified in the body of text; (d) automatically selecting key words and/or phrases with high rarity scores and/or vocabulary levels from the words and/or phrases identified in the body of text; and (e) automatically creating a test which measures the person's understanding of these selected key words and/or phrases.

BRIEF INTRODUCTION TO THE FIGURES

FIG. 1 shows a diagram of a method for detecting AI-generated content in a body of text asserted to have been written by a person.

DETAILED DESCRIPTION OF THE FIGURES

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can include creating a database of words and/or phrases, wherein words and/or phrases in the database has one or more associated rarity scores and/or vocabulary levels. In an example, an automated method (e.g. method implemented via a computer software and/or program) for detecting AI-generated content in text asserted to have been written by a specific person can include receiving a body of text which is asserted to have been written by a specific person. In an example, an automated method (e.g. method implemented via a computer software and/or program) for detecting AI-generated content in text asserted to have been written by a specific person can include automatically scanning through the body of text to identify words and/or phrases.

In an example, an automated method (e.g. method implemented via a computer software and/or program) for detecting AI-generated content in text asserted to have been written by a specific person can include automatically identifying the field (e.g. field of study, discipline, field of research, type of profession, and/or news topic) addressed by the body of text. In an example, an automated method (e.g. method implemented via a computer software and/or program) for detecting AI-generated content in text asserted to have been written by a specific person can include automatically assigning rarity scores and/or vocabulary levels to words and/or phrases identified in the body of text.

In an example, an automated method (e.g. method implemented via a computer software and/or program) for detecting AI-generated content in text asserted to have been written by a specific person can include automatically selecting key words and/or phrases with high rarity scores and/or vocabulary levels from the words and/or phrases identified in the body of text. In an example, an automated method (e.g. method implemented via a computer software and/or program) for detecting AI-generated content in text asserted to have been written by a specific person can include automatically grouping these selected key words and/or phrases into sub-sets. In an example, an automated method (e.g. method implemented via a computer software and/or program) for detecting AI-generated content in text asserted to have been written by a specific person can include automatically creating a test which measures a person's understanding of these selected key words and/or phrases.

In an example, an automated method (e.g. method implemented via a computer software and/or program) for detecting AI-generated content in text asserted to have been written by a specific person can include creating a database of words and/or phrases, wherein each word and/or phrase in the database has one or more associated rarity scores (e.g. scores for infrequency of use of the word and/or phrase) and/or one or more vocabulary levels (e.g. the grade level at which the word and/or phrase is generally understood or used). This database can be used to assign rarity scores and/or vocabulary levels to words and/or phrases in a submitted body of text, wherein these rarity scores and/or vocabulary levels can be used to select key words and/or phrases to test the understanding of the asserted author of the body of text.

In an example, an automated method (e.g. method implemented via a computer software and/or program) for detecting AI-generated content in text asserted to have been written by a specific person can use a database of words and/or phrases, wherein each word and/or phrase in the database has a rarity score. In an example, the database can be used to assign rarity scores to words and/or phrases in a submitted body of text in order to select the rarest words and/or phrases for inclusion in a test of a person's understanding of these words and/or phrases. In an example, this database can be a data structure in memory, a relational database, an object-oriented database, an index file, and/or a flat file.

In an example, a database of words and/or phrases can include a rarity score for each word and/or phrase, wherein the rarity score is a measure of the rarity and/or infrequency of usage of the word and/or phrase in (a large corpus of) written material. In an example, a database of words and/or phrases can include a rarity score for each word and/or phrase, wherein a rarity score is an inverse and/or negative function of the frequency of usage of the word and/or phrase in (a large corpus of) written material. In an example, a database of phrases can be used to search a body of text for previously-identified words and/or phrases. In an example, a database of phrases can be used to identify potential key phrases in a body of text.

In an example, an automated method (e.g. method implemented via a computer software and/or program) for detecting AI-generated content in text asserted to have been written by a specific person can include using a database which contains words and/or phrases and rarity scores associated with those words and/or phrases. In an example, an automated method (e.g. method implemented via a computer software and/or program) for detecting AI-generated content in text asserted to have been written by a specific person can include using a database which contains words and/or phrases and vocabulary levels associated with those words and/or phrases. In an example, this method can match words and/or phrases identified in a submitted body of text with words and/or phrases in a database and assign rarity scores to those words and/or phrases from the rarity scores in the database.

In an example, a database of phrases can associate a vocabulary level in general usage with each phrase in the database. In an example, a database of words can associate a vocabulary level in general usage with each word in the database. In an example, this database of phrases can be used to identify and select phrases in a body of text with a high vocabulary level above a selected level in general usage, wherein these are the selected key words and/or phrases are incorporated into a test to measure the person's understanding of words and/or phrases used in body of text. In an example, this database of words can be used to identify and select key words in a body of text with a high vocabulary level above a selected level, wherein these are the selected key words for whom the person's understanding of their meanings is tested.

In an example, rather than using a single database or words and/or phrases, a method can use several different field-specific databases. In an example, this method can identify the field (e.g. field of study, discipline, field of research, type of profession, and/or news topic) addressed by a submitted body of text and select a database of words and/or phrases for use which is specific to that field. In an example, a database of words and/or phrases can include a field-specific rarity scores for words and/or phrases in the database, wherein a field-specific rarity score is a measure of the rarity and/or infrequency of usage of a word and/or phrase in (a large corpus of) written material in a specific field (e.g. field of study, discipline, field of research, type of profession, and/or news topic). In an example, a database of words and/or phrases can include field-specific rarity scores and/or vocabulary levels associated with these words and/or phrases.

In an example, an automated method (e.g. method implemented via a computer software and/or program) can use multiple field-specific databases of words and/or phrases, wherein each database includes a rarity score associated with usage of the word and/or phrase in a specific field (e.g. field of study, discipline, field of research, type of profession, and/or news topic). In an example, an automated method (e.g. method implemented via a computer software and/or program) for detecting AI-generated content in text asserted to have been written by a specific person can include using several field-specific databases of words and/or phrases, wherein each word and/or phrase in a database has an associated field-specific rarity score (e.g. a measure of rarity or infrequency of usage in (a large corpus of) written material in the field and/or inclusion only in a higher vocabulary level in the field).

In an example, an automated method (e.g. method implemented via a computer software and/or program) for detecting AI-generated content in a body of text can include creating a database with words and/or phrases and field-specific rarity scores for these words and/or phrases based on analysis of word and/or phrase usage frequency in (a large corpus of) written material in a specific field (e.g. field of study, discipline, field of research, type of profession, and/or news topic). In an example, a database can contain a plurality of field-specific rarity scores and/or vocabulary levels associated with words and/or phrases. In an example, rather than having just a single rarity score associated with each word and/or phrase, a database can have multiple field-specific rarity scores (e.g. for different fields) associated with each word and/or phrase.

In an example, words and/or phrases in a database of phrases can be grouped into sets of synonymous words and/or phrases. In an example, words and/or phrases in a database of phrases can be grouped into sets of words and/or phrases with substantially-equivalent meanings. In an example, an automated method (e.g. method implemented via a computer software and/or program) for detecting AI-generated content in text asserted to have been written by a specific person can include using a database of words and/or phrases, wherein these words and/or phrases are organized into groups of words and/or phrases with similar (e.g. substantially equivalent) meanings. The term "synonyms" means single words with similar (e.g. substantially equivalent) meanings. The term "phrase synonyms" or just "synonyms" can also be applied to multi-word phrases with similar (e.g. substantially-equivalent) meanings.

In an example, a body of text to be analyzed by this method can be submitted and/or uploaded as a file. In an example, a body of text to be analyzed by this method must be submitted in selected format (e.g. a word processing file format or a text format). In an example, a body of text must be written in a selected language or in a language included in a selected group of languages. In an example, a body of text must have a minimum number of words. In an example, a body of text must have a minimum length. In an example, a body of text received as part of this method can be directly submitted and/or uploaded by the person asserting authorship of the text and the resulting text can be self-administered. In an example, a body of text received as part of this method can be directly submitted and/or uploaded by a person to whom the body of text was sent from the asserted author and the resulting test can be administered by this person to the asserted author.

In an example, a body of text can be a written course assignment which was submitted by a student. In an example, a body of text can be a written assignment which has been submitted by a student as their original work for a course. In an example, a body of text can be received from a course instructor who, in turn, received it from a student representing it as their original work for a course. In an example, a submitted body of text can be of a type selected from the group consisting of: a lab report, a recommended course of action for a company, a poem, a legal brief, a business case study write up, a strategic plan, a literature review, a magazine article, a marketing plan, an essay, a movie review, a musical, a news story, a research study, a research paper, a journal article, lyrics for a song, a lab report, a book review, a screen play, a composition, a SWOT analysis, a law case study write up, a course of action for a clinical case, a valuation analysis, an editorial piece, a financial analysis, a portion of a dissertation, a business analysis, a speech, a short story, a play, a discussion post, an answer to a word problem, and a novel.

In an example, a body of text can be received as input by software. In an example, a body of text can be received via an application programming interface (API). In an example, a body of text can be entered (e.g. cut and pasted) automatically into an online form. In an example, a body of text can be received by uploading a file (e.g. to a website). In an example, a body of text can be received by uploading the body of text to a website. In an example, a body of text can be received through a website. In an example, a body of text can be received via owl post. In an example, a body of text can be received via one or more networking protocols selected from the group consisting of: file transfer protocol (FTP); hypertext transport protocol (HTTP); multiprotocol label switching (MPLS); and transmission control protocol/Internet protocol (TCP/IP). In an example, this method can include receiving an uploaded body of text which is asserted to have been written by a specific person.

In an example, a body of text can be processed and/or filtered before it is scanned for identification of words and/or phrases. In an example, a body of text can be processed using one or more text-processing actions selected from the following group of actions: using optical character recognition (OCR) to convert images to text, converting all characters to lower case characters, converting all characters to upper case characters, eliminating hyphens at the ends of text lines, replacing all punctuation marks with spaces, replacing colons with spaces, replacing commas with spaces, replacing exclamation marks with spaces, replacing hyphens with spaces, replacing parentheses with spaces, replacing periods with spaces, replacing question marks with spaces, replacing quote marks with spaces, replacing semicolons with spaces, replacing stings comprising multiple contiguous spaces with single spaces, and replacing multi-space gaps with single spaces.

In an example, this method can include scanning a body of text in order to identify words and/or phrases in the body of text. In an example, words and/or phrases which match words and/or phrases in a database can be identified and scores associated with word and/or phrase rarity can be assigned. In an example, a method can include automatically scanning a body of text to extract text strings, wherein these text strings start at successive (e.g. text character by text character) locations in the body of text and overlap each other. In an example, these text strings can have uniform lengths. In an example, text strings can start at successive (e.g. text character by text character) locations in the body of text and end at spaces. In an example, text strings can start at successive (e.g. text character by text character) locations in the body of text and end at the Nth space encountered, where N is a selected number between 2 and 5.

In an example, an automated method (e.g. method implemented via a computer software and/or program) can include scanning a submitted body of text to identify words and/or phrases. In an example, text strings with a selected length in terms of number of characters can be extracted from a submitted body of text for identification and selection of words and/or phrases. In an example, a method can scan sequential text strings of a pre-selected length in a submitted body of text to identify words and/or phrases. In an example, text strings with different lengths can be extracted from a submitted body of text for identification and selection of words and/or phrases. In an example, sequential overlapping text strings with a selected length in terms of number of characters (with their starting positions moving sequentially character-by-character through the text) can be extracted from a submitted body of text for identification and selection of words and/or phrases. In an example, this method can include dividing a submitted body of text into multiple strings which are analyzed to detect words and/or phrases which are in a database of words and/or phrases.

In an example, a method can include: automatically scanning a submitted body of text character by character, word by word, and/or phrase by phrase to identify words and/or phrases; and automatically assigning rarity scores to identified words and/or phrases. In an example, a method can include scanning sequential text strings in a submitted body of text to identify words and/or phrases. In an example, characters in a body of text can be scanned in a sequential manner to identify words and/or phrases in a database of words and/or phrases, wherein selected key words and/or phrases are selected from these identified words and/or phrases based on their high vocabulary level or rarity in general usage.

In an example, words and/or phrases in a body of text can be identified by analysis of a series of sequential text strings extracted from a submitted body of text, wherein the starting positions of these text strings move sequentially through the body of the text and the ending positions of these text strings are spaces. In an example, words and/or phrases in a body of text can be identified by analysis of a series of sequential text strings extracted from a submitted body of text, wherein the starting positions of these text strings move sequentially through the body of the text and the ending positions of these text strings are spaces which are with a selected range of number of characters after the starting location. In an example, words and/or phrases in a body of text can be identified by analysis of a series of sequential text strings extracted from a submitted body of text, wherein the starting positions of these text strings move sequentially through the body of the text and the ending positions of these text strings are spaces which are with a selected range (e.g. between 5 and 50) of number of characters after the starting location.

In an example, this method can include analyzing a series of overlapping text strings of a selected length, wherein each text string starts at a selected character position, and wherein the selected character position moves sequentially through a submitted body of text. In an example, this method can include extracting a series of overlapping text strings, wherein each text string starts at a selected character position, and wherein the selected character position moves sequentially (character by character) through a submitted body of text.

In an example, the primary field addressed by a received body of text can be identified. In an example, a field-specific database of words and/or phrases can be used to analyze a received body of text based on the primary field identified by the body of text. In an example, a field can be a field of study, a field of research, an academic discipline, a type of profession, and/or a news topic. In an example, one or more fields can be selected from the group consisting of: Business, Investment, Real Estate, Fashion, Military, Engineering, Mathematics, Utilities, Chemistry, Restaurants, Anthropology, Health Care, Paulitics, Clothing, Journalism, Retail, Commodities, Law, Shipping, Communications, Legislation, Sociology, Banking, Insurance, Computer Science, Library Science, Textiles, Construction, Linguistics, Theater, Economics, Literature, Tourism, Fine Art, Music, Finance, Mining, Biology, International Trade, Public Administration, Biomedical, Internet, Public Utilities, Aerospace, Food Industry, Natural Sciences, Architecture, History, Philosophy, Carlography, Religion, Art, Hospitality, Physics, Astronomy, Information Technology, Jamesology, Psychology, Entertainment, Medicine, Agriculture, Geography, Nursing, Energy, Marketing, Transportation, Artificial Intelligence, Humanities, Politics, Education, Manufacturing, and Trade.

In an example, a method can include automated identification of the field (e.g. field of study, discipline, field of research, type of profession, and/or news topic) which is addressed by a received body of text. In an example, a method can use Artificial Intelligence (AI) to identify the field (e.g. field of study, discipline, field of research, type of profession, and/or news topic) which is addressed by a received body of text. In an example, an automated method (e.g. method implemented via a computer software and/or program) can use statistical methods (such as discriminant analysis) to identify the field (e.g. field of study, discipline, field of research, type of profession, and/or news topic) automatically which is addressed by a received body of text.

In an example, a method can include: identifying a primary field addressed by a body of text; automatically selecting a field-specific database of words and/or phrases for the identified field which includes field-specific rarity scores for words and/or phrases; automatically assigning field-specific rarity scores to words and/or phrases in the submitted body of text; and automatically selecting key words and/or phrases from the words and/or phrases in the submitted body of text for inclusion in a test of a person's understanding of those key words and/or phrases.

In an example, a method can assign rarity scores to words and/or phrases which are identified in a received body of text. In an example, each word and/or phrase can be assigned one rarity score. In an example, words and/phrases identified in a body of text which are also in a previously-created database of words and/or phrases can be assigned rarity scores. In an example, words and/phrases identified in a body of text which are also in a previously-created database of words and/or phrases can be assigned rarity scores from the rarity scores in the database. In an example, a word and/phrase identified in a body of text which is also in a previously-created database of words and/or phrases can be assigned the rarity score associated with that word and/or phrase in the database.

In an example, a rarity score can be a measure of the rarity and/or infrequency of usage in (a large corpus of) written material. In an example, a rarity score can be a measure of the rarity and/or infrequency of usage in a corpus of written material which is much larger than the received body of text. In an example, a rarity score can be a measure of the rarity and/or infrequency of usage in a corpus of written material which is at least two orders or magnitude larger than the received body of text. In an example, a field-specific rarity score can be a measure of the rarity and/or infrequency of usage in (a large corpus of) written material in a specific field. In an example, a field-specific rarity score can be a measure of the rarity and/or infrequency of usage in a corpus of written material which in a specific field is much larger than the received body of text. In an example, a field-specific rarity score can be a measure of the rarity and/or infrequency of usage in a corpus of written material in a specific field which is at least two orders or magnitude larger than the received body of text.

In an example, a rarity score can be an inverse (or negative) function of the frequency of usage in (a large corpus of) written material. In an example, a rarity score can be an inverse (or negative) function of the frequency of usage in a corpus of written material which is much larger than the received body of text. In an example, a rarity score can be an inverse (or negative) function of the frequency of usage in a corpus of written material which is at least two orders or magnitude larger than the received body of text. In an example, a field-specific rarity score can be an inverse (or negative) function of the frequency of usage in (a large corpus of) written material in a specific field. In an example, a field-specific rarity score can be an inverse (or negative) function of the frequency of usage in a corpus of written material which in a specific field is much larger than the received body of text. In an example, a field-specific rarity score can be an inverse (or negative) function of the frequency of usage in a corpus of written material in a specific field which is at least two orders or magnitude larger than the received body of text.

In an example, key words and/or phrases for inclusion in a test can be selected based on their rarity of usage in (a large corpus of) written material. In an example, words and/or phrases can be selected from a body of text (for inclusion in a test of the asserted author's understanding of those words and/or phrases) based on the frequency of use of those words and/or phrases in general usage, wherein lower frequency words and/or phrases are more likely to be selected. In an example, words and/or phrases can be selected from a body of text (for inclusion in a test of the asserted author's understanding of those words and/or phrases) based on the frequency of use of those words and/or phrases in usage by the general population, wherein lower frequency words and/or phrases are more likely to be selected In an example, a field-specific rarity score can be determined for a word and/or phrase based on the infrequency of usage of that word and/or phrase in (a large corpus of) written material in a specific field. In an example, words and/or phrases can be selected from a body of text (for inclusion in a test of the asserted author's understanding of those words and/or phrases) based on the frequency of use of those words and/or phrases in usage by a selected sub-population, career group, field of study, and/or demographic group of which the asserted author is a member. In an example, a rarity score assigned to a word and/or phrase can be an inverse and/or negative function of the frequency of its use in (a large corpus of) work written by a selected sub-population and/or demographic group of which the person asserted to be the author of a submitted body of text is a member.

In an example, a rarity score assigned to a word and/or phrase can be an inverse (or negative) function of the percentage of people in a selected demographic group (e.g. age group) who are able to correctly identify synonyms and/or antonyms of the word and/or phrase based on previous test results. In an example, a rarity score assigned to a word and/or phrase can be an inverse (or negative) function of the percentage of people in a selected demographic group (e.g. age group or educational level) who are able to correctly identify synonyms and/or antonyms of the word and/or phrase based on previous test results.

In an example, words and/or phrases can be selected for inclusion in a test of a person's understanding based on their frequency of usages in (a large corpus of) text which has been previously written by AI. In an example, words and/or phrases can be assigned AI frequency scores based on the frequency with which they have appeared in material written by AI. In an example, a "rarity score" for a word and/or phrase can be a function of the frequency of the word and/or phrase in (a large corpus of) material written by AI. In an example, a "rarity score" for a word and/or phrase can be a positive function of the frequency of the word and/or phrase in (a large corpus of) material written by AI.

In an example, selected key words and/or phrases from the body of text can be selected as selected key words based on their frequency of understanding by a selected population. In an example, a field-specific rarity score for a word or phrase can be an inverse (or negative) function of the vocabulary level required for usage and/or understanding of this word or phrase in a particular field (e.g. field of study, discipline, field of research, type of profession, and/or news topic). In an example, a field-specific rarity score for a word or phrase can be an inverse (or negative) function of the minimum number of words in a vocabulary level required for usage and/or understanding of that word or phrase in a particular field (e.g. field of study, discipline, field of research, type of profession, and/or news topic). In an example, words and/phrases which are identified in a submitted body of text are each automatically assigned a rarity score based the infrequency of their usage by a specific demographic group (e.g. age group).

In an example, a person-specific rarity score can be determined for a word and/or phrase based on the infrequency of usage of that word and/or phrase in a corpus of material which has been previously written by a specific person. In an example, a person-specific rarity score for a word and/or phrase can be an inverse (or negative) function of the frequency of usage of that word and/or phrase in a corpus of material which has been previously written by a specific person. In an example, a rarity score for a word and/or phrase can be based on the infrequency of use of the word and/or phrase in a corpus of written material which was previously written by a person who is the asserted author of a currently-submitted body of text. In an example, a rarity score assigned to a word and/or phrase can be an inverse and/or negative function of the frequency of use of the word and/or phrase in work which is known to have been previously written by the person asserted to be the author of a submitted body of text.

In an example, a vocabulary level can be based on how many words a person use and/or understand, wherein a higher vocabulary level is associated with using and/or understanding a larger number of words. In an example, a vocabulary level associated with a word and/or phrase can assigned based on how many words must generally be in a person's vocabulary in order for the person to use and/or understand that word or phrase. In an example, a rarity score for a word and/or phrase can be based on the vocabulary level at which the word and/or phrase is first generally used and/or understood. In an example, a field-specific rarity score for a word and/or phrase can be based on the vocabulary level in a specific field at which the word and/or phrase is first generally used and/or understood. In an example, vocabulary level can be measured based on active vocabulary. In an example, vocabulary level can be measured based on passive vocabulary.

In an example, a rarity score for a word and/or phrase can be based on the number of words in a vocabulary level at which the word and/or phrase is first generally used and/or understood. In an example, a rarity score for a word or phrase can be an inverse (or negative) function of the vocabulary level required for usage and/or understanding of this word or phrase. In an example, a rarity score for a word or phrase can be an inverse (or negative) function of the minimum number of words in a vocabulary level required for usage and/or understanding of that word or phrase. In an example, the vocabulary level assigned to a word can be based on how many words a person generally must use to understand the meaning of that word. In an example, the vocabulary level assigned to a word can be based on how many words (e.g. 10,000, 30,000, 50,000, or 70,000) a person generally must use to understand the meaning of that word.

In an example, words and/or phrases can be selected from a body of text based on the number of words in a vocabulary level which (in order of ascending vocabulary level) starts to include the selected key words and/or phrases. Words and/or phrases from vocabulary levels with higher numbers of words are more likely to be selected for inclusion in a test. In an example, a rarity score assigned to a word and/or phrase can be a function of the grade-level of vocabulary which is generally required for understanding and/or use of that word and/or phrase. In an example, a rarity score assigned to a word and/or phrase can be a positive function of the number of words in a (general-population) person's vocabulary level which is (generally) required for the words and/or phrase to start being understood and/or used by the (general-population) person.

In an example, rarity scores and/or vocabulary levels for words and/or phrases (e.g. in a database) can be updated based on analysis of additional text (e.g. new bodies of text submitted for analysis). In an example, rarity scores and/or vocabulary levels for specific words and/or phrases (e.g. in a database) can be updated using Bayesian statistical methods based on analysis of additional text (e.g. new bodies of text submitted for analysis). In an example, rarity scores and/or vocabulary levels for specific words and/or phrases (e.g. in a database) can be updated in an iterative manner based on analysis of additional text (e.g. new bodies of text submitted for analysis).

In an example, a rarity score assigned to a word and/or phrase can be an inverse (or negative) function of the number or percentage of people in the general population who are able to correctly define the word and/or phrase based on previous test results. In an example, a rarity score assigned to a word and/or phrase can be an inverse (or negative) function of the number or percentage of people in a specific field who are able to correctly define the word and/or phrase based on previous test results. In an example, a rarity score assigned to a word and/or phrase can be an inverse (or negative) function of the percentage of people who are able to correctly identify synonyms and/or antonyms of the word and/or phrase based on previous test results.

In an example, rarity scores for words and/or phrases (e.g. in a database) can be based on the number and/or percentage of people whose test results indicate understanding of their meanings. In an example, rarity scores for words and/or phrases (e.g. in a database) can be an inverse (or negative) function of the number and/or percentage of people whose test results indicate understanding of their meanings. In an example, rarity scores for words and/or phrases (e.g. in a database) can updated based on the results from new tests performed in accordance with this method. In an example, rarity scores for words and/or phrases (e.g. in a database) can updated (e.g. in an iterative and/or Bayesian manner) based on the results from new tests performed in accordance with this method.

In an example, words and/or phases can be assigned scores based on the frequency of their usage in (a large corpus of) material written by AI. In an example, words and/or phases in a submitted body of text can be assigned scores based on a positive function of the frequency of their usage in (a large corpus of) material which is known to have been written by AI. In an example, words and/or phrases can be selected from a body of text (for inclusion in a test of the asserted author's understanding of those words and/or phrases) based on the frequency of use of those words and/or phrases in bodies of text composed by artificial intelligence, wherein high frequency words and/or phrases are more likely to be selected.

In an example, a word and/or phrase can be assigned a rarity score based on one or more factors selected from the group consisting of: the frequency of usage of a word and/or phrase in (a large corpus of) material written for (or by) people in the general population, the frequency of usage of a word and/or phrase in (a large corpus of) material available on the internet, the frequency of usage of a word and/or phrase in (a large corpus of) material written for (or by) people in specific field, the frequency of usage of a word and/or phrase in (a large corpus of) material written for (or by) people in a specific demographic group, the frequency of usage of a word and/or phrase in (a large corpus of) material written for (or by) people in a specific profession, the frequency of usage of a word and/or phrase in (a large corpus of) material written for (or by) people at a specific educational level, the frequency of usage of a word and/or phrase in (a large corpus of) material written for (or by) people with a specific native language, the frequency of usage of a word and/or phrase in (a large corpus of) material written for (or by) people with a specific level of fluency in a language, the frequency of usage of a word and/or phrase in material previously written by the person who is asserted to be the author of a submitted body of text, the frequency of usage of a word and/or phrase in (a large corpus of) material written by AI (e.g. machine generated material), the frequency of understanding of the meaning of a word and/or phrase in past testing (e.g. using this method), the educational level needed for a person to understand and/or use a word and/or phrase, the general vocabulary level needed for a person to understand and/or use a word and/or phrase, and the field-specific vocabulary level needed for a person to understand and/or use a word and/or phrase.

In an example, a word and/or phrase can be assigned a rarity score based (on a multivariate function of) two or more factors selected from the group consisting of: the frequency of usage of a word and/or phrase in (a large corpus of) material written for (or by) people in the general population, the frequency of usage of a word and/or phrase in (a large corpus of) material available on the internet, the frequency of usage of a word and/or phrase in (a large corpus of) material written for (or by) people in specific field, the frequency of usage of a word and/or phrase in (a large corpus of) material written for (or by) people in a specific demographic group, the frequency of usage of a word and/or phrase in (a large corpus of) material written for (or by) people in a specific profession, the frequency of usage of a word and/or phrase in (a large corpus of) material written for (or by) people at a specific educational level, the frequency of usage of a word and/or phrase in (a large corpus of) material written for (or by) people with a specific native language, the frequency of usage of a word and/or phrase in (a large corpus of) material written for (or by) people with a specific level of fluency in a language, the frequency of usage of a word and/or phrase in material previously written by the person who is asserted to be the author of a submitted body of text, the frequency of usage of a word and/or phrase in (a large corpus of) material written by AI (e.g. machine generated material), the frequency of understanding of the meaning of a word and/or phrase in past testing (e.g. using this method), the educational level needed for a person to understand and/or use a word and/or phrase, the general vocabulary level needed for a person to understand and/or use a word and/or phrase, and the field-specific vocabulary level needed for a person to understand and/or use a word and/or phrase.

In an example, a word and/or phrase can be assigned a rarity score based on: a negative (or inverse) function of frequency of usage of a word and/or phrase in (a large corpus of) material written for (or by) people in the general population, a negative (or inverse) function of frequency of usage of a word and/or phrase in (a large corpus of) material available on the internet, a negative (or inverse) function of frequency of usage of a word and/or phrase in (a large corpus of) material written for (or by) people in specific field, a negative (or inverse) function of frequency of usage of a word and/or phrase in (a large corpus of) material written for (or by) people in a specific demographic group, a negative (or inverse) function of frequency of usage of a word and/or phrase in (a large corpus of) material written for (or by) people in a specific profession, a negative (or inverse) function of frequency of usage of a word and/or phrase in (a large corpus of) material written for (or by) people at a specific educational level, a negative (or inverse) function of frequency of usage of a word and/or phrase in (a large corpus of) material written for (or by) people with a specific native language, a negative (or inverse) function of frequency of usage of a word and/or phrase in (a large corpus of) material written for (or by) people with a specific level of fluency in a language, a negative (or inverse) function of frequency of usage of a word and/or phrase in material previously written by the person who is asserted to be the author of a submitted body of text, a positive function of frequency of usage of a word and/or phrase in (a large corpus of) material written by AI (e.g. machine generated material), a negative (or inverse) function of frequency of understanding of the meaning of a word and/or phrase in past testing (e.g. using this method), a negative (or inverse) function of educational level needed for a person to understand and/or use a word and/or phrase, a negative (or inverse) function of general vocabulary level needed for a person to understand and/or use a word and/or phrase, and/or a negative (or inverse) function of field-specific vocabulary level needed for a person to understand and/or use a word and/or phrase.

In an example, a method can automatically select key words and/or phrases from among the words and/or phrases identified in a body of text based on the rarity scores of the words and/or phrases. In an example, these selected words and/or phrases are then included in a test which is administered to the person who is asserted to be author of the body of text in order to measure that person's understanding of these words and/or phrases. In an example, words and/or phrases with relatively high rarity scores can be selected for incorporation into a test.

In an example, a method can include selecting key words and/or phrases from a submitted body of text based on these words and/or phrases having high rarity scores. In an example, a method can include selecting key words and/or phrases from a submitted body of text based on these words and/or phrases having high general rarity scores. In an example, a method can include selecting key words and/or phrases from a submitted body of text based on these words and/or phrases having high field-specific rarity scores. In an example, a method can include selecting key words and/or phrases from a submitted body of text based on these words and/or phrases having rarity scores which are high relative to other words and/or phrases in the submitted body of text.

In an example, a specific (e.g. pre-determined) number of key words and/or phrases can be selected from a body of text for inclusion in a test. In an example, an automated method (e.g. method implemented via a computer software and/or program) for detecting AI-generated content in text asserted to have been written by a specific person can include selecting a pre-determined number of key words and/or phrases from a submitted body of text to be included in a test which measures a person's understanding of those key words and/or phrases. In an example, words and/or phrases with rarity scores above a specific minimum score can be selected for incorporation into a test. In an example, key words and/or phrases for inclusion in a test can be those with rarity scores above a minimum level.

In an example, a method can automatically select key words and/or phrases from a submitted body of text whose usage frequencies in (a large corpus of) written material are below a selected percentile (X %) of usage frequencies. In an example, an automated method (e.g. method implemented via a computer software and/or program) can include selecting key words and/or phrases from a submitted body of text based on these words and/or phrases having rarity scores which are above a selected percentile of all words and/or phrases in the submitted body of text.

In an example, a method can include automatically ranking words and/or phrases from a submitted body of text in decreasing order of rarity scores. In an example, words and/or phrases can be automatically ranked in descending order of rarity scores. Then key words and/or phrases can be selected in descending order until a specific number (e.g. between 10 and 30) of key words and/or phrases has been selected for incorporation into a test. In an example, a method can include ranking words and/or phrases from a submitted body of text in decreasing order of rarity scores and selecting key words and/or phrase in this descending order (starting at the top and working down in rarity scores) until a pre-determined number of key words and/or phrases has been selected. In an example, key words and/or phrases can be selected by: automatically sorting a list of identified words and/or phrases in a body of text in order of descending rarity score; and automatically selecting words cumulatively down the list until a selected (minimum) rarity score is reached.

In an example, an automated method (e.g. method implemented via a computer software and/or program) can include ranking words and/or phrases from a submitted body of text in decreasing order of rarity scores and selecting key words and/or phrase in this descending order (starting at the top and working down in rarity scores) until a pre-determined number (e.g. between 5 and 50) of key words and/or phrases has been selected. In an example, key words and/or phrases can be selected by: automatically sorting a list of identified words and/or phrases in a body of text in order of descending rarity score; and automatically selecting words cumulatively down the list until a selected (e.g. pre-determined) automatically percentage of words and/or phrases have been selected.

In an example, a method can include automatically sorting a list of identified words and/or phrases in a body of text in order of descending vocabulary level. In an example, a method can include automatically selecting a database specific to a field to assign field-specific rarity scores to words and/or phrases in the body of text in that field. In an example, a method can include automatically selecting a subset of the words and/or phrases from a body of text with the highest rarity and/or vocabulary scores from among all words and/or phrases in the body of text. In an example, a method can include automatically selecting relatively-long words from the text. In an example, a method can include automatically selecting words cumulatively down a vocabulary-level-ranked list of words and/or phrases until a selected (minimum) vocabulary level is reached.

In an example, a method can include automatically selecting a pre-determined number (e.g. between 5 and 50) of key words and/or phrases from the identified words and/or phrases with the highest rarity scores among all identified words and/or phrases in a body of text. In an example, a method can include automatically selecting a subset of the words and/or phrases from a body of text, wherein this subset is selected as being relatively rare based on their assigned scores. In an example, a method can include automatically using a computer program and/or software to select key words and/or phrases based on their having high rarity scores. In an example, a method can include automatically selecting key identified words and/or phrases with high rarity scores.

In an example, a method can include automatically selecting key text strings with high rarity scores. In an example, a method can include automatically selecting a pre-determined number (e.g. between 9 and 21) of key words and/or phrases from the identified words and/or phrases with the highest rarity scores among all identified words and/or phrases in a body of text. In an example, a method can include automatically selecting key single words and multi-word phrases with high rarity scores. In an example, a target number can be selected for the number of words to be selected from a body of text for inclusion in a test of understanding.

In an example, an automated method (e.g. method implemented via a computer software and/or program) for detecting AI-generated content in text asserted to have been written by a specific person can include selecting a first pre-determined number of key words and a second pre-determined number of key phrases from a submitted body of text based on the rarity of these words and phrases, wherein these key words and phrases are included in a test which measures a person's understanding of those key words and key phrases. In an example, a method can include selecting a first pre-determined number of key words and/or phrases from a body of text based on their having high rarity scores and also selecting a second pre-determined number of key words and/or phrases from the body of text at random. In an example, a test can measure a person's understanding of both the relatively rare words and/or phrases and the randomly-selected words and/or phrases.

In an example, method can include selecting key words and/or phrases from a submitted body of text based on these words and/or phrases having higher field-specific rarity scores. In an example, method can include selecting key words and/or phrases from a submitted body of text based on these words and/or phrases having field-specific rarity scores which are higher than a selected minimum value. In an example, method can include selecting key words and/or phrases from a submitted body of text based on these words and/or phrases having field-specific rarity scores which are above a selected percentile of all words and/or phrases in the submitted body of text. In an example, method can include selecting key words and/or phrases from a submitted body of text based on these words and/or phrases having field-specific rarity scores which are above a selected percentile of words and/or phrases in a much larger corpus of written material in the field.

In an example, key words and/or phrases from a body of text can be selected as key words based on their being part of a higher level vocabulary. In an example, multivariate analysis can be used to identify select key words and/or phrases in a submitted body of text which are associated with relatively-high vocabulary levels. In an example, key words and/or phrases can be selected by: automatically sorting a list of identified words and/or phrases in a body of text in order of descending vocabulary level; and automatically selecting words cumulatively down the list until a selected (minimum) vocabulary level is reached.

In an example, a method can automatically select key words and/or phrases from a submitted body of text which have an associated vocabulary level (e.g. grade level or number of words) above a pre-determined minimum level (e.g. grade level or number of words). In an example, a method can automatically select key words and/or phrases from a submitted body of text which have an associated vocabulary level (e.g. educational level) above a pre-determined minimum vocabulary level (e.g. educational level), wherein the minimum vocabulary level is a function of the educational level of the asserted author of the body of text.

In an example, a method can include selecting key words and/or phrases from a body of text which is asserted to have been written by a specific person based on these words and/or phrases having high rarity scores considering previous material written by that person. In an example, a method can include selecting key words and/or phrases from a body of text which is asserted to have been written by a specific person based on these key words and/or phrases having been infrequently used (or not used at all) in material previously written by that person. In an example, a method can include selecting key words and/or phrases from a submitted body of text based on these words and/or phrases having person-specific rarity scores which are high relative to other words and/or phrases in the submitted body of text.

In an example, an automated method (e.g. method implemented via a computer software and/or program) can include selecting key words and/or phrases from a submitted body of text based on these words and/or phrases having person-specific rarity scores which are higher than a selected minimum value. In an example, a method can include selecting key words and/or phrases from a submitted body of text based on these words and/or phrases having person-specific rarity scores which are above a selected percentile of words and/or phrases in a corpus of written material which was previously written by the person who is asserted to be the author of this body of text.

In an example, a method can automatically group selected key words and/or phrases into sub-sets. In an example, key words and/or phrases can be selected from a body of text and sub-sets of these selected key words and/or phrases can be incorporated into a test to measure a person's understanding of their meanings. In an example, subsets (e.g. subsets of 2-6 words and/or phrases each) of words and/or phrases can be selected from a submitted body of text can be selected and included in a test to measure a person's (e.g. the asserted author of the body of text) understanding of the words and/or phrases in those subsets. In an example, subsets of words and/or phrases can be selected from a submitted body of text can be selected and included in a test to measure a person's (e.g. the asserted author of the body of text) understanding of the words and/or phrases in those subsets.

In an example, artificial intelligence (AI) can be used to the select key words and/or phrases from a body of text which are relatively rare (e.g. have high rarity scores) in general usage. In an example, artificial intelligence (AI) can be used to select key words and/or phrases from a body of text which are most rare. In an example, artificial intelligence (AI) can be used to the select key words and/or phrases from a body of text which are used most infrequently in general usage. In an example, artificial intelligence (AI) can be used to the select key words and/or phrases from a body of text which are used most infrequently in a specific field. In an example, artificial intelligence (AI) can be used to the select key words and/or phrases from a body of text which are used most infrequently by a selected demographic group (e.g. group in a selected age category, group in a selected educational level, group in a selected profession, etc.).

In an example, a method can automatically select key words and/or phrases from among the words and/or phrases in a submitted body of text based on a multivariate function of: the usage frequency of those words and/or phrases in general usage; and the usage frequency of those words and/or phrases in a specific field. In an example, a method can automatically select key words and/or phrases from among the words and/or phrases in a submitted body of text based on a multivariate function of: the usage frequency of those words and/or phrases in general usage; the usage frequency of those words and/or phrases in a specific field; and the usage frequency of those words and/or phrases in prior written material by the person who is asserted to be the author of the submitted body of text.

In an example, a method can automatically select key words and/or phrases from among the words and/or phrases in a submitted body of text based on a multivariate function of: the usage frequency of those words and/or phrases in a corpus of general written material; the usage frequency of those words and/or phrases in a corpus of written material in a specific field; and the usage frequency of those words and/or phrases in a corpus of written material written by the person who is asserted to be the author of the submitted body of text. In an example, a method can automatically select key words and/or phrases from among the words and/or phrases in a submitted body of text based on a multivariate function of: the usage frequency of those words and/or phrases in a corpus of general written material; and the usage frequency of those words and/or phrases in a corpus of written material in a specific field.

In an example, a method can automatically select key words and/or phrases from among the words and/or phrases in a submitted body of text based on a multivariate function of: the usage frequency of those words and/or phrases in a corpus of general written material; and the usage frequency of those words and/or phrases in a corpus of written material written by the person who is asserted to be the author of the submitted body of text.

In an example, a method can include creating a test which measure a person's understanding of key words and/or phrases selected from a body of text which is asserted to have been written by the person. Greater understanding of these words and/or phrases by the person increases the probability that the person authored the body of text. Lower understanding of these words and/or phrases by the person decreases the probability that the person authored the body of text and increases the probability that the body of text was written by AI. In an example, a low percentage of correct answers on a test of understanding of key words and/or phrases by a person can indicate a higher probability that the person used AI to generate the content.

In an example, a method can include creating a test (e.g. a multiple-choice test, a matching test, and/or a fill-in-the-blank test) which measures a person's understanding of the meanings of the selected key words and/or phrases. In an example, a method can create (e.g. create, produce, construct, write, provide, output, print, and/or format) a test which measures a person's understanding of key words and/or phrases which have been selected from a submitted body of text. In an example, a method can create (e.g. create, produce, construct, write, provide, output, print, and/or format) a test which measures a person's understanding of key words and/or phrases selected from a body of text for which that person has asserted authorship. In an example, a method can create a test which measures a person's understanding of the synonyms or antonyms of key words and/or phrases which have been selected from a submitted body of text.

In an example, a method can include automatically creating a test (e.g. a multiple-choice test, a matching test, and/or a fill-in-the-blank test which measures understanding of the meanings, definitions, synonyms, antonyms, and/or categories of words and/or phrases) which measures the person's understanding of key words and/or phrases selected from a submitted body of text. In an example, a method can include automatically creating a test of understanding of key words and/or phrases used in the body of text, wherein the key words and/or phrases are selected based on their rarity or infrequency of usage in a corpus of written material in a specific field.

In an example, a method can include selecting key words and/or phrases from a submitted body of text which is asserted to have been written by a person, grouping these key words and/or phrases in sub-sets, and creating a test which requires the person to match words and/or phrases in a subset with other words and/or phrases with similar (e.g. equivalent) meanings. In an example, a method can including automatically creating (e.g. creating, producing, constructing, writing, providing, printing, and/or formatting) a test (e.g. multiple-choice test, matching test, and/or fill-inthe-blank test) which measures a person's understanding of key words and/or phrases selected from a submitted body of text.

In an example, a method can include automatically creating a test comprising multiple-choice questions which measure a person's understanding of key words and/or phrases selected from a submitted body of test which is asserted to have been written by that person. In an example, a method can include automatically creating a test which measures the person's understanding of definitions of those key words and/or phrases. In an example, a method can include automatically creating a test which measures the person's understanding of definitions of those key words and/or phrases by presenting the person with multiple alternative words and/or phrases, some of which have similar meanings to the key words and/or phrases. In an example, a method can include automatically creating a test which asks a person to match key words and/or phrases with alternative words and/or phrases with similar meanings.

In an example, a method can include automatically creating a test which asks a person to match key words and/or phrases with alternative words and/or phrases with similar meanings within groups, subsets, and/or batches of key words and/or phrases. In an example, a method can include automatically creating a test with groups, subsets, and/or batches of key words and/or phrases and alternative words and/or phrases, wherein a person is asked to match key words and/or phrases with alternative words with similar (e.g. equivalent) meanings within each group, subset, and/or batch. In an example, a test can be structured with subsets of selected key words and/or phrases, wherein for each subset, the person taking the test has to match words and/or phrases in a first column with words and/phrases in a second column based on similarity of meaning.

In an example, a method can include automatically creating a test which includes a series of multiple-choice questions which measure a person's understanding of selected key words and/or phrases by presenting the person with multiple alternative words and/or phrases for those key words and/or phrases, wherein the person must select one or more of the alternative words and/or phrases which have similar meanings. In an example, a method can include automatically creating a test which includes a series of multiple-choice questions which measure a person's understanding of selected key words and/or phrases by presenting, for each selected key word and/or phrase, multiple possible synonyms (i.e. single word synonyms for single words and equivalent phrases for phrases) from which the person must choose the correct one(s).

In an example, a method can include automatically creating a test which includes multiple choice questions in which the person is asked to identify synonyms or antonyms of the selected key words and/or phrases. In an example, a method can include automatically creating a test which includes multiple choice questions in which the person is asked to identify equivalent expressions for the selected key words and/or phrases. In an example, a method can include automatically creating a test wherein, for each key word and/or phrase selected from a submitted body of text, the test presents multiple alternative words and/or phrases and the person taking the test must chose which (e.g. one or more) of the multiple alternative words and/or phrases are similar in meaning to the key word and/or phrase.

In an example, a method can include automatically creating a test wherein, for each key word and/or phrase selected from a submitted body of text, the test presents multiple alternative words and/or phrases, wherein each of the alternative words and/or phrases has an (alpha-numeric) automatically label, and wherein the person taking the test must indicate the label(s) of the alternative word(s) and/or phrase(s) which are similar in meaning to the key word and/or phrase. In an example, a method can include automatically creating a test which includes multiple choice questions in which the person is asked to identify sentences in which the selected key words and/or phrases are used correctly.

In an example, a test can have a matching task format. In an example, a method can include automatically creating a test which requires the test taker to match (e.g. match, link, connect, select, or pair) words and/or phrases which have similar (e.g. equivalent) meanings. In an example, a test can comprise a series of subsets of selected key words and/or phrases, wherein for each subset, a person taking the test has to match each word and/or phrase in the subset with a different word and/or phrase with a similar meaning. In an example, this method can create a test which requires the test taker to match (e.g. match, link, connect, select, or pair) words and/or phrases which are synonyms.

In an example, a method can include automatically creating a fill-in-the-blank type of test. In an example, a test to measure a person's understanding of the meanings of the selected key words and/or phrases can comprise fill-in-the-blank questions in which the person is asked to give definitions of the selected key words and/or phrases. In an example, a test to measure a person's understanding of the meanings of the selected key words and/or phrases can comprise fill-in-the-blank questions in which the person is asked to give synonyms or antonyms of the selected key words and/or phrases.

In an example, a method can automatically create a test of a person's understanding of key words and/or phrases in a submitted body of text which is provided and/or administered online (e.g. via the internet). In an example, a method can create an online test which measures a person's understanding of selected key words and/or phrases. In an example, a test can be administered to a person in digital format. In an example, a method can create a digital test which measures a person's understanding of selected key words and/or phrases.

In an example, a method can create a virtual test which measures a person's understanding of selected key words and/or phrases. In an example, a method can automatically create a test which is displayed on a computer screen.

In an example, a test can be taken online with monitoring to ensure no AI, internet, or other machine-based assistance. In an example, a test can be taken online with optical monitoring to ensure no AI, internet, or other machine-based assistance. In an example, a test can be taken online with eye-tracking monitoring to ensure no AI, internet, or other machine-based assistance. In an example, a test can be provided in an online format with sufficiently rapid presentation of questions to reduce possible AI, internet, or other machine-based assistance.

In an example, a method can automatically create a test which is administered via one or more components selected from the group consisting of: an electronic tablet device, AR eyewear, a gesture-recognition device, headphones, smart glasses, VR eyewear, a touch screen, one or more sheets of paper, an EEG band, a computer mouse, a keyboard, an EMG band, a laptop, a smart watch, a computer screen, and a phone.

In an example, a method can automatically create a test which is administered to a person in an audio format. In an example, a method can automatically create a test which is administered orally to a person. In an example, a method can automatically create a test which is a series of orally-administered questions. In an example, a method can automatically create a test which is administered orally via headphones. In an example, a method can automatically create a test which is administered orally via computer-generated speech. In an example, a test can comprise a series of oral questions which are presented to a person via computer-generated speech and headphones.

In an example, a method can create a printed and/or written test which measures a person's understanding of selected key words and/or phrases. In an example, a method can automatically create a test which is administered in person. In an example, a method can automatically create a test in a printed (e.g. paper) format. In an example, a method can automatically create a test which is a paper document. In an example, a method can automatically create a test in a paginated format. In an example, a test can be printed out on paper and taken in person. In an example, a test can be printed out on paper and taken by someone in person, without any help from electronic devices.

In an example, a method described herein can be embodied in software. In an example, any of the steps, operations, or processes of a method described herein can be performed or implemented via software. In an example, a method described herein can include stored instructions and/or commands. In an example, a method described herein can be embodied in a set of instructions and/or commands which are executable by a computer or other digital system. In an example, a method described herein can be implemented in a medium that provides instructions to a CPU for execution. In an example, a method described herein can be a software application. In an example, a method described herein can include an Application Program Interface (API). In an example, a method described herein can include an Application Program Interface (API) with a set of computer programming instructions.

In an example, an automated method (e.g. method implemented via a computer software and/or program) for detecting AI-generated content in text asserted to have been written by a specific person can be embodied in (e.g. be embodied, implemented, and/or stored) in source code, interpretive code, object code, and/or directly executable code. In an example, any of the steps, operations, or processed described herein can be executed by a computer program code. In an example, a method described herein can be embodied in a computer program. In an example, a method describe herein can be embodied in a computer program written in a language selected from the group consisting of: Javascript, Kotlin, MonTEE, Python, PHP, Ruby, Java, Swift, C #, and Go. In an example, this method can be implemented in an operating system environment selected from the group consisting of: Android, Chrome OS, HolOS, Linux, Mac OS, OS, Ubuntu, UNIX, and Windows.

In an example, implementation of a method described herein can include insertion of computer code into a website template. In an example, this method can be embodied in deploying computer program code which performs all the steps of the method. In an example, this method can be embodied in a computer-usable program code. In an example, this method can be implemented via computer program instructions. In an example, a method described herein can be implemented via application programs, applications, computer programs, machine programs, operating system software, programs, software components, and/or system programs.

In an example, a method described herein can be implemented via a computer program, software, software application, script, or code. In an example, this method can be implemented in software which is written or coded using a programming language. In an example, this method can be implemented by software, a computer program, and/or a computer code. In an example, this method can include a computer program. In an example, software for this method can: automatically scan through the body of text to identify words and/or phrases; and automatically assign a rarity score to each identified word and/or phrase.

In an example, a method described herein can be a computer-implemented method. In an example, a method described herein can be implemented in a hand held computing system, a mainframe computer, a mobile computing system, a personal computer, a phone, a server, and/or a workstation. In an example, a method described herein can be embodied entirely in software, entirely in hardware, or embodied in a combination of software and hardware. In an example, a method described herein can be embodied in a network which comprises wires, wireless communication links, and/or fiber optic channels. In an example, a method described herein can be embodied in an electronic, magnetic, electromagnetic, optical, and/or semiconductor system. In an example, a method described herein can be executed in a hardware component such as a processor or CPU.

In an example, a method described herein can be implemented in a network of data processing systems. In an example, a method described herein can be implemented in an electronic computing device selected from the group consisting of: cell phone, desktop, iPad, laptop, personal digital assistant, server, smartphone, and tablet. In an example, a method described herein can be implemented in an optical disk, a magnetic disk, and/or a hard disk. In an example, a method described herein can be implemented in one or more devices selected from the group consisting of: computer tablet and/or pad; desktop computer; laptop computer; mobile phone; computer server; smart glasses; and smart watch. In an example, a method described herein can be implemented on a database server.

In an example, a method described herein can be embodied a set of instructions and/or commands which are stored in a computer-readable storage medium. In an example, a method described herein can be implemented in a non-transitory computer readable storage medium. In an example, a method described herein can be implemented in a computer readable medium that contains, stores, communicates, or transports a set of executable commands and actionable files. In an example, this method can be implemented via flash memory, holographic memory, random access memory (RAM), or read only memory (ROM). In an example, a method described herein can be embodied in executable commands and/or instructions which are stored in a computer hard disk, a computer-readable optical medium, a RAM, and/or a PROM.

In an example, a method described herein can be implemented on a digital signal processor, a discrete element circuit, a general purpose computer, a microcontroller, a microprocessor, a peripheral integrated circuit element, a programmable logic device, and/or a special purpose computer. In an example, a method described herein can be implemented on a web server. In an example, a method described herein can be implemented on a server over a network such as the Internet or World Wide Web. In an example, a method described herein can be implemented via the internet. A method described herein can be implemented via a computer network. In an example, a method described herein can be implemented within a computer, a central processing unit (CPU), a computing platform, and/or a computing system. In an example, a method described herein can be implemented within computer hardware, a data processor, a data processing unit, and/or a computer-readable medium.

In an example, a method described herein can be stored, implemented, and/or executed in computer readable media. A method described herein can be implemented in a computer readable medium. A method described herein can be implemented in a computer-readable storage medium. In an example, any of the steps, operations, or processed described herein can be performed or implemented in a computer-readable medium. In an example, one or more of the steps in a method described herein can be implemented in a non-transitory computer-readable storage medium. In an example, one or more of the steps in a method described herein can be implemented in a non-transitory computer-readable storage medium containing computer program code.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically identifying the field (e.g. field of study, discipline, field of research, type of profession, and/or news topic) addressed by the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically identifying the field (e.g. field of study, discipline, field of research, type of profession, and/or news topic) addressed by the body of text; automatically selecting key words and/or phrases with high rarity scores and/or vocabulary levels from the words and/or phrases identified in the body of text; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; automatically grouping these selected key words and/or phrases into sub-sets; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically selecting key words and/or phrases with high rarity scores and/or vocabulary levels from the words and/or phrases identified in the body of text; automatically grouping these selected key words and/or phrases into sub-sets; and automatically creating a test which measures the person's understanding of these selected key words and/or phrases.

In an example, an automated method (e.g. method implemented via a computer software and/or program) for detecting AI-generated content in text asserted to have been written by a specific person can comprise: receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; automatically grouping these selected key words and/or phrases into sub-sets; and automatically creating a test which measures the person's understanding of these selected key words and/or phrases.

In an example, an automated method (e.g. method implemented via a computer software and/or program) for detecting AI-generated content in text asserted to have been written by a specific person can comprise: creating a database of words and/or phrases, wherein words and/or phrases in the database has one or more associated rarity scores and/or vocabulary levels; receiving a body of text which is asserted to have been written by a specific person; automatically scanning the body of text to identify words and/or phrases; automatically identifying the field (e.g. field of study, discipline, field of research, type of profession, and/or news topic) addressed by the body of text; automatically assigning rarity scores and/or vocabulary levels to words and/or phrases identified in the body of text; automatically selecting key words and/or phrases with high rarity scores and/or vocabulary levels from the words and/or phrases identified in the body of text; automatically grouping these selected key words and/or phrases into sub-sets; and automatically creating a test which measures the person's understanding of these selected key words and/or phrases.

In an example, an automated method (e.g. method implemented via a computer software and/or program) for detecting AI-generated content in text asserted to have been written by a specific person can comprise: (a) using machine-learning (e.g. AI) and/or a statistical method (such as discriminant analysis) to determine the field (e.g. field of study, discipline, field of research, type of profession, and/or news topic) automatically of a body of text; and (b) automatically selecting a database specific to that field to assign field-specific rarity scores to words and/or phrases in the body of text.

In an example, an automated method (e.g. method implemented via a computer software and/or program) for detecting AI-generated content in text asserted to have been written by a specific person can comprise: (a) using machine-learning (e.g. AI) and/or a statistical method (such as discriminant analysis) to determine the field (e.g. field of study, discipline, field of research, type of profession, and/or news topic) automatically of a submitted body of text.

In an example, an automated method (e.g. method implemented via a computer software and/or program) can comprise: (a) automatically identifying the field (e.g. field of study, discipline, field of research, type of profession, and/or news topic) automatically addressed by a body of text which is asserted to have been written by a specific person; (b) automatically identifying multi-word phrases in the body of text; (c) automatically assigning field-specific rarity scores to these multi-word phrases; (d) automatically selecting key multi-word phrases with higher field-specific rarity scores; and (e) automatically creating a test to measure the person's understanding of the meanings of the selected key multi-word phrases.

In an example, an automated method (e.g. method implemented via a computer software and/or program) can comprise: (a) automatically identifying the field (e.g. field of study, discipline, field of research, type of profession, and/or news topic) automatically addressed by a body of text which is asserted to have been written by a specific person; (b) automatically identifying multi-word phrases in the body of text; (c) automatically using a field-specific database of multi-word phrases to assign field-specific rarity scores to these multi-word phrases; (d) automatically selecting key multi-word phrases with higher field-specific rarity scores; and (e) automatically creating a test to measure the person's understanding of the meanings of the selected key multi-word phrases.

In an example, an automated method (e.g. method implemented via a computer software and/or program) can comprise: (a) automatically identifying the field (e.g. field of study, discipline, field of research, type of profession, and/or news topic) automatically addressed by a body of text which is asserted to have been written by a specific person; (b) automatically identifying words and/or phrases in the body of text; (c) automatically assigning field-specific rarity scores to these words and/or phrases; (d) automatically selecting key words and/or phrases with higher field-specific rarity scores; and (e) automatically creating a test to measure the person's understanding of the meanings of the selected key words and/or phrases.

In an example, an automated method (e.g. method implemented via a computer software and/or program) can comprise: (a) automatically identifying the field (e.g. field of study, discipline, field of research, type of profession, and/or news topic) automatically addressed by a body of text which is asserted to have been written by a specific person; (b) automatically identifying words and/or phrases in the body of text; (c) automatically using a field-specific database of words and/or phrases to assign field-specific rarity scores to these words and/or phrases; (d) automatically selecting key words and/or phrases with higher field-specific rarity scores; and (e) automatically creating a test to measure the person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically using AI and/or statistical methods to identify the field (e.g. field of study, discipline, field of research, type of profession, and/or news topic) automatically which is addressed by the body of text; (c) automatically scanning the body of text to identify words and/or phrases; (d) automatically assigning field-specific rarity scores (e.g. measures of rarity or infrequency of usage in a corpus of written material in the field which is much larger than the submitted text, and/or inclusion only in a higher vocabulary level in the field) automatically to the words and/or phrases, wherein these field-specific rarity scores come from a database which is specific to the identified field, wherein the database includes a field-specific rarity score for each word and/or phrase in the database; (e) automatically selecting a subset of key words and/or phrases from the body of text which have relatively high field-specific rarity scores; and (f) creating (e.g. creating, producing, constructing, writing, providing, printing, and/or formatting) a test (e.g. multiple-choice test, matching test, and/or fill-in-the-blank test) which measures the person's understanding of those selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically identifying the field (e.g. field of study, discipline, field of research, type of profession, and/or news topic) automatically addressed by the body of text; (c) automatically scanning the body of text to identify words and/or phrases; (d) automatically assigning field-specific rarity scores (e.g. measures of rarity or infrequency of usage in a corpus of written material in the identified field which is much larger than the submitted text, and/or inclusion only in a higher vocabulary level in the field) automatically to the words and/or phrases used in the body of text, wherein these rarity scores come from a database of words and/or phrases which is specific to the identified field; (e) automatically selecting a subset of the words and/or phrases from the body of text with the highest scores from among all words and/or phrases in the body of text; (f) creating (e.g. creating, producing, constructing, writing, providing, printing, and/or formatting) a test (e.g. multiple-choice test, matching test, and/or fill-in-the-blank test) which measures the human author's understanding of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically using AI and/or statistical methods (such as discriminant analysis) to identify the field (e.g. field of study, discipline, field of research, type of profession, and/or news topic) automatically of the body of text; (c) automatically scanning the body of text to identify words and/or phrases; (d) automatically assigning field-specific rarity scores (e.g. measures of rarity or infrequency of usage in a corpus of written material in the identified field which is much larger than the submitted text, and/or inclusion only in a higher vocabulary level in the field) automatically to the words and/or phrases used in the body of text; (e) automatically selecting a subset of the words and/or phrases from the body of text with the highest scores from among all words and/or phrases in the body of text; (f) creating (e.g. creating, producing, constructing, writing, providing, printing, and/or formatting) a test (e.g. multiple-choice test, matching test, and/or fill-in-the-blank test) which measures the person's understanding of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically identifying the field (e.g. field of study, discipline, field of research, type of profession, and/or news topic) automatically addressed by the body of text; (c) automatically scanning the body of text to identify words and/or phrases; (d) automatically assigning field-specific rarity scores (e.g. measures of rarity or infrequency of usage in a corpus of written material in the identified field which is much larger than the submitted text, and/or inclusion only in a higher vocabulary level in the field) automatically to the words and/or phrases used in the body of text, wherein these rarity scores come from a database of words and/or phrases which is specific to the identified field; (e) automatically selecting a subset of the words and/or phrases from the body of text, wherein this subset is selected as being relatively rare based on their assigned scores; (f) creating (e.g. creating, producing, constructing, writing, providing, printing, and/or formatting) a test (e.g. multiple-choice test, matching test, and/or fill-in-the-blank test) which measures the human author's understanding of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically identifying the field (e.g. field of study, discipline, field of research, type of profession, and/or news topic) automatically which is addressed by the body of text; (c) automatically assigning field-specific rarity scores (e.g. measures of rarity or infrequency of usage in a corpus of written material in the identified field which is much larger than the submitted text, and/or inclusion only in a higher vocabulary level in the field) automatically to words and/or phrases in the body of text using a field-specific database of words and/or phrases, wherein the database is specific to the identified field; (d) automatically selecting key words and/or phrases from the body of text which have relatively-high field-specific rarity scores; and (e) automatically creating (e.g. creating, producing, formatting, and/or providing) a test which measures the person's understanding of those selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify text strings with a pre-determined length; (c) automatically assigning rarity scores to the text strings; (d) automatically selecting key text strings with high rarity scores; and (e) automatically creating a test which measures a person's understanding of the meanings of those key text strings.

In an example, an automated method (e.g. method implemented via a computer software and/or program) for detecting AI-generated content in text asserted to have been written by a specific person can comprise: (a) receiving a body of text; (b) automatically scanning the body of text to identify fixed-length text strings; (c) automatically assigning rarity scores to the text strings; (d) automatically selecting key text strings with high rarity scores; and (e) automatically creating a test which measures a person's understanding of the meanings of those key text strings.

In an example, an automated method (e.g. method implemented via a computer software and/or program) for detecting AI-generated content in text asserted to have been written by a specific person can comprise: (a) receiving a body of text which is asserted to have be written by a person; (b) automatically scanning the body of text to extract uniform-length text strings, wherein these text strings start at successive (e.g. text character by text character) locations in the body of text and overlap each other; (c) automatically using a database of words and/or phrases to identify words and/or phrases in the text strings; (d) automatically assigning rarity scores to the identified words and/or phrases; (e) automatically selecting key identified words and/or phrases with high rarity scores; and (f) creating a test which measures the person's understanding of the meanings of these key identified words and/or phrases.

In an example, an automated method (e.g. method implemented via a computer software and/or program) for detecting AI-generated content in text asserted to have been written by a specific person can comprise: (a) receiving a body of text which is asserted to have be written by a person; (b) automatically scanning the body of text to extract text strings, wherein these text strings start at successive (e.g. text character by text character) locations in the body of text and overlap each other; (c) automatically using a database of words and/or phrases to identify words and/or phrases in the text strings; (d) automatically assigning rarity scores to the identified words and/or phrases; (e) automatically selecting key identified words and/or phrases with high rarity scores; and (f) creating a test which measures the person's understanding of the meanings of these key identified words and/or phrases.

In an example, an automated method (e.g. method implemented via a computer software and/or program) for detecting AI-generated content in text asserted to have been written by a specific person can comprise: (a) receiving a body of text which is asserted to have be written by a person; (b) automatically scanning the body of text to extract text strings, wherein these text strings start at successive (e.g. text character by text character) locations in the body of text and end at a space (e.g. blank text character between words); (c) automatically using a database of words and/or phrases to identify words and/or phrases in the text strings; (d) automatically assigning rarity scores to the identified words and/or phrases; (e) automatically selecting key identified words and/or phrases with high rarity scores; and (f) creating a test which measures the person's understanding of the meanings of these key identified words and/or phrases.

In an example, an automated method (e.g. method implemented via a computer software and/or program) for detecting AI-generated content in text asserted to have been written by a specific person can comprise: (a) receiving a body of text which is asserted to have be written by a person; (b) automatically scanning the body of text to extract text strings, wherein these text strings start at successive (e.g. text character by text character) locations in the body of text and end at the Nth space (e.g. blank text character between words) encountered, where N is a selected number between 2 and 5; (c) automatically using a database of words and/or phrases to identify words and/or phrases in the text strings; (d) automatically assigning rarity scores to the identified words and/or phrases; (e) automatically selecting key identified words and/or phrases with high rarity scores; and (f) creating a test which measures the person's understanding of the meanings of these key identified words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to extract uniform-length text strings which start at successive (text character by text character) positions; (c) automatically assigning rarity scores to the text strings; (d) automatically selecting key text strings with high rarity scores; and (e) automatically creating a test which measures a person's understanding of the meanings of those key text strings.

In an example, an automated method (e.g. method implemented via a computer software and/or program) for detecting AI-generated content in text asserted to have been written by a specific person can comprise: (a) receiving a body of text which is asserted to have been written by a specific person; (b) automatically scanning the body of text to identify words and/or phrases; (c) automatically assigning a rarity score (e.g. a measure of rarity or infrequency of usage in a corpus of written material which is much larger than the submitted text, and/or inclusion only in a higher vocabulary level) for each word and/or phrase; (d) automatically selecting key words and/or phrases with high rarity scores (e.g. above a minimum score or selected percentile) automatically; and (e) automatically creating a test (e.g. a multiple-choice test, a matching test, and/or a fill-in-the-blank test which measures understanding of the meanings, definitions, synonyms, antonyms, and/or categories of words and/or phrases) which measures the person's understanding of these selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify words and/or phrases; (c) automatically assigning a rarity score to each identified word and/or phrase; (d) automatically selecting a pre-determined number (e.g. between 5 and 50) of key words and/or phrases from the identified words and/or phrases with the highest rarity scores among all identified words and/or phrases in the body of text; and (e) automatically creating a test which measures a person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify words and/or phrases; (c) automatically assigning a rarity score to each identified word and/or phrase; (d) automatically selecting a pre-determined number (e.g. between 9 and 21) of key words and/or phrases from the identified words and/or phrases with the highest rarity scores among all identified words and/or phrases in the body of text; and (e) automatically creating a test which measures a person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify words and/or phrases; (c) automatically assigning a rarity score to each identified word and/or phrase; (d) automatically selecting key words and/or phrases from the identified words and/or phrases whose rarity scores are above a selected percentile; and (e) automatically creating a test which measures a person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify words and/or phrases; (c) automatically assigning a rarity score to each identified word and/or phrase; (d) automatically selecting key words and/or phrases from the identified words and/or phrases whose rarity scores are above a selected percentile score of all identified words and/or phrases in the body of text; and (e) automatically creating a test which measures a person's understanding of the meanings of the selected key words and/or phrases.

In an example, an automated method (e.g. method implemented via a computer software and/or program) for detecting AI-generated content in text asserted to have been written by a specific person can comprise: (a) receive a body of text as input; (b) automatically scan through the body of text to identify words and/or phrases; (c) automatically assign a rarity score (e.g. a measure of rarity or infrequency of usage in a corpus of written material which is much larger than the submitted text, and/or inclusion only in a higher vocabulary level) in general usage to each word and/or phrase; (d) automatically select key words and/or phrases with higher rarity scores in general usage; and (e) automatically create a test which measures a person's understanding of the meanings of these selected key words and/or phrases.

In an example, an automated method (e.g. method implemented via a computer software and/or program) for detecting AI-generated content in text asserted to have been written by a specific person can comprise: (a) receiving a body of text; (b) automatically identifying words and/or phrases in the body of text; (c) automatically assigning rarity scores to the words and/or phrases; (d) automatically selecting key words and/or phrases based on their having high rarity scores; and (e) automatically creating a test which measures a person's understanding of the selected key words and/or phrases.

In an example, an automated method (e.g. method implemented via a computer software and/or program) for detecting AI-generated content in text asserted to have been written by a specific person can comprise: (a) receive a body of text; (b) automatically identify words and/or phrases in the body of text; (c) automatically assign rarity scores to the words and/or phrases; (d) automatically select key words and/or phrases based on their having high rarity scores; and (e) automatically create a test which measures a person's understanding of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically scanning the body of text to identify words and/or phrases; (c) automatically assigning a rarity score (e.g. a measure of rarity or infrequency of usage in a corpus of written material which is much larger than the submitted text, and/or inclusion only in a higher vocabulary level) to each word and/or phrase; (d) automatically selecting key words and/or phrases with a high rarity scores; and (e) automatically creating a test which measures the person's understanding of the meanings of these selected key words and/or phrases.

In an example, an automated method (e.g. method implemented via a computer software and/or program) for detecting AI-generated content in text asserted to have been written by a specific person can comprise: (a) receiving a body of text; (b) automatically scanning the body of text to identify single words and multi-word phrases; (c) automatically assigning rarity scores to these single words and multi-word phrases; (d) automatically selecting key single words and multi-word phrases with high rarity scores; and (e) automatically creating a test to measuring a person's understanding of these key single words and multi-word phrases.

In an example, an automated method (e.g. method implemented via a computer software and/or program) for detecting AI-generated content in text asserted to have been written by a specific person can comprise: (a) receiving a body of text; (b) automatically scanning the body of text to identify multi-word phrases; (c) automatically assigning rarity scores to these multi-word phrases; (d) automatically selecting key multi-word phrases with high rarity scores; and (e) automatically creating a test to measuring a person's understanding of these key multi-word phrases.

In an example, an automated method (e.g. method implemented via a computer software and/or program) for detecting AI-generated content in text asserted to have been written by a specific person can comprise: (a) receiving a body of text; (b) automatically scanning the body of text to identify two-word phrases; (c) automatically assigning rarity scores to these two-word phrases; (d) automatically selecting key two-word phrases with high rarity scores; and (e) automatically creating a test to measuring a person's understanding of these key two-word phrases.

In an example, an automated method (e.g. method implemented via a computer software and/or program) for detecting AI-generated content in text asserted to have been written by a specific person can comprise: (a) receiving a body of text; (b) automatically scanning the body of text to identify phrases with two or three words; (c) automatically assigning rarity scores to these phrases; (d) automatically selecting key phrases with high rarity scores; and (e) automatically creating a test to measuring a person's understanding of these key phrases.

In an example, an automated method (e.g. method implemented via a computer software and/or program) for detecting AI-generated content in text asserted to have been written by a specific person can comprise: (a) receiving a body of text; (b) automatically scanning the body of text to identify text strings; (c) automatically assigning rarity scores to the text strings; (d) automatically selecting key text strings with high rarity scores; and (e) automatically creating a test which measures a person's understanding of the meanings of those key text strings.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting relatively-long key words from the text; and (c) automatically creating a test which measures the person's understanding of the meanings of the selected key words.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting relatively-long key words from the text; and (c) automatically creating a test which measures the person's understanding of the meanings of the selected key words, wherein poor understanding by the person of the meanings of these selected key words indicates a higher probability that the person used AI to generate the content.

In an example, an automated method (e.g. method implemented via a computer software and/or program) for detecting AI-generated content in text asserted to have been written by a specific person can comprise: (a) receiving a body of text; (b) automatically selecting key words and/or phrases from the text; and (c) automatically create a test which measures person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting key words and/or phrases from the text; and (c) automatically creating a test which measures the person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting key words and/or phrases from the text; and (c) automatically creating a test which measures the person's understanding of the meanings of the selected key words and/or phrases, wherein poor understanding by the person of the meanings of these selected key words and/or phrases indicates a higher probability that the person used AI to generate the content.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting key words and/or phrases from the text; and (c) automatically creating a test which measures the person's understanding of the meanings of the selected key words and/or phrases, wherein poor understanding by the person of the meanings of these selected key words and/or phrases indicates a higher probability that the person used AI to generate the content.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting relatively-rare (e.g. infrequently used) automatically key words and/or phrases from the text; and (c) automatically creating a test which measures the person's understanding of the meanings of the selected key words and/or phrases, wherein poor understanding by the person of the meanings of these selected key words and/or phrases indicates a higher probability that the person used AI to generate the content.

In an example, an automated method (e.g. method implemented via a computer software and/or program) for detecting AI-generated content in text asserted to have been written by a specific person can comprise: (a) receiving a body of text which is asserted to have been written by a specific person; (b) automatically selecting relatively-rare (e.g. infrequently used) automatically key words and/or phrases from the text; and (c) automatically creating a test which measures the person's understanding of the meanings of the selected key words and/or phrases.

In an example, an automated method (e.g. method implemented via a computer software and/or program) for detecting AI-generated content in text asserted to have been written by a specific person can comprise: (a) receiving a body of text which is asserted to have been written by a specific person; and (b) automatically creating a test of understanding of selected key words and/or phrases used in the body of text which is to be taken by the person, wherein the selected key words and/or phrases are selected based on their rarity or infrequency of usage in (a large corpus of) written material.

In an example, an automated method (e.g. method implemented via a computer software and/or program) for detecting AI-generated content in text asserted to have been written by a specific person can comprise: (a) receiving as input a body of text which is asserted to have been written by a specific person; and (b) automatically creating as output a test of understanding of selected key words and/or phrases used in the body of text which is to be taken by the person.

In an example, an automated method (e.g. method implemented via a computer software and/or program) for detecting AI-generated content in text asserted to have been written by a specific person can comprise: (a) receiving a body of text which is asserted to have been written by a specific person; and (b) automatically creating a test of understanding of selected key words and/or phrases used in the body of text which is to be taken by the person, wherein the selected key words and/or phrases are selected based on their rarity or infrequency of usage in a corpus of written material in a specific field.

In an example, a submitted body of text can be scanned to identify words and/or phrases which are in a database of words and/or phrases, wherein each word and/or phrase is assigned a score, wherein the score is a function of the vocabulary level and/or frequency of general usage associated with the word and/or phrase, and wherein words and/or phrases with scores above a selected percentile (relative to all words and/or phrases used in the body of text) are selected for inclusion in a test which is administered to the person who claims to have authored the body of text.

In an example, a submitted body of text can be scanned to identify words and/or phrases which are in a database of words and/or phrases, wherein each word and/or phrase is assigned a score, wherein the score is a function of the vocabulary level and/or frequency of general usage associated with the word and/or phrase, wherein words and/or phrases with a score above a selected level are selected for inclusion in a test which is administered to the person who claims to have authored the body of text, and wherein the text measures the person's understanding of the meanings of the selected key words and/or phrases.

In an example, an automated method (e.g. method implemented via a computer software and/or program) can comprise: (a) automatically identifying multi-word phrases in a body of text which is asserted to have been written by a specific person; (b) automatically assigning a rarity score to each of these multi-word phrases; (c) automatically selecting key multi-word phrases with higher rarity scores; and (d) automatically creating a test to measure the person's understanding of the meanings of the selected key multi-word phrases.

In an example, an automated method (e.g. method implemented via a computer software and/or program) can comprise: (a) automatically identifying words and/or phrases in a body of text which is asserted to have been written by a specific person; (b) automatically assigning a rarity score to each of these words and/or phrases; (c) automatically selecting key words and/or phrases with higher rarity scores; and (d) automatically creating a test to measure the person's understanding of the meanings of the selected key words and/or phrases.

In an example, an automated method (e.g. method implemented via a computer software and/or program) for detecting AI-generated content in text asserted to have been written by a specific person can comprise: (a) automatically selecting key words and/or phrases from a submitted body of text which is asserted to have been written by a specific person; (b) automatically grouping these selected key words and/or phrases into sub-sets (e.g. subsets of 2-7 words and/or phrases each); and (c) automatically creating a test to measure the person's understanding of words and/or phrases in each subset.

In an example, an automated method (e.g. method implemented via a computer software and/or program) for detecting AI-generated content in text asserted to have been written by a specific person can comprise: (a) automatically selecting key words and/or phrases from a submitted body of text which is asserted to have been written by a specific person; (b) automatically grouping these selected key words and/or phrases into sub-sets (e.g. subsets of 2-7 words and/or phrases each); and (c) automatically creating a test to measure the person's understanding of words and/or phrases in each subset, wherein for each subset the person has to match words and/or phrases in the subset with other words and/or phrases with similar meanings.

In an example, an automated method (e.g. method implemented via a computer software and/or program) for detecting AI-generated content in text asserted to have been written by a specific person can comprise: (a) automatically selecting key words and/or phrases from a submitted body of text which is asserted to have been written by a specific person; (b) automatically grouping these selected key words and/or phrases into sub-sets (e.g. subsets of 2-7 words and/or phrases each); and (c) automatically creating a test to measure the person's understanding of words and/or phrases in each subset, wherein for each word in a subset the person has to match it with different word and/or phrase with a similar meaning.

In an example, an automated method (e.g. method implemented via a computer software and/or program) for detecting AI-generated content in text asserted to have been written by a specific person can comprise: (a) automatically selecting key words and/or phrases from a submitted body of text based on their having high rarity scores; (b) automatically grouping these selected key words and/or phrases into subsets of 5-15 words and/or phrases each; and (c) automatically creating a test wherein, for each subset, the person taking the test must match key words and/or phrases in the subset with other words and/or phrases which have similar (e.g. equivalent) meanings.

In an example, an automated method (e.g. method implemented via a computer software and/or program) for detecting AI-generated content in text asserted to have been written by a specific person can comprise: (a) automatically selecting key words and/or phrases from a submitted body of text based on their having high rarity scores; (b) automatically grouping these selected key words and/or phrases into subsets of 5-15 words and/or phrases each; and (c) automatically creating a test wherein, for each key word and/or phrase in a subset, the person taking the test must match that key word and/or phrase with another word and/or phrase which has a similar (e.g. equivalent) meaning.

In an example, software for detecting AI-generated content in text asserted to have been written by a specific person can: (a) receive a body of text which is asserted to have been written by a specific person as input; (b) automatically scan through the body of text to identify words and/or phrases; (c) automatically assign a rarity score (e.g. a measure of rarity or infrequency of usage in a corpus of written material which is much larger than the submitted text, and/or inclusion only in a higher vocabulary level) to each word and/or phrase; (d) automatically select key words and/or phrases with higher rarity scores; and automatically create a test which measures the person's understanding of the meanings of these selected key words and/or phrases.

In an example, an automated method (e.g. method implemented via a computer software and/or program) for detecting AI-generated content in text asserted to have been written by a specific person can comprise: (a) automatically using a computer program and/or software to receive a body of text; (b) automatically using a computer program and/or software to identify words and/or phrases in the body of text; (c) automatically using a computer program and/or software to assign rarity scores to the words and/or phrases; (d) automatically using a computer program and/or software to select key words and/or phrases based on their having high rarity scores; and (e) automatically using a computer program and/or software to create a test which measures a person's understanding of the selected key words and/or phrases.

In an example, software for detecting AI-generated content in text asserted to have been written by a specific person can: (a) receive a body of text which is asserted to have been written by a specific person as input; (b) automatically select key words and/or phrases from the text; and (c) automatically create a test which measures the person's understanding of the meanings of the selected key words and/or phrases.

FIG. 1 shows a block diagram of an automated method (e.g. method implemented via a computer software and/or program) for detecting AI-generated content in text asserted to have been written by a specific person can comprising the following steps: receiving a body of text which is asserted to have been written by a specific person 101; automatically scanning the body of text to identify words and/or phrases 102; automatically assigning rarity scores and/or vocabulary levels to words and/or phrases identified in the body of text 103; automatically selecting key words and/or phrases with high rarity scores and/or vocabulary levels from the words and/or phrases identified in the body of text 104; and automatically creating a test which measures the person's understanding of these selected key words and/or phrases 105. In an example, these block components can be steps. Other method steps and variations which are discussed elsewhere in this disclosure can be also applied to this example where relevant.

I claim:

1. A method of using a computer to detect AI-generated content in a written assignment submitted by a student, the method comprising:

creating a plurality of field-specific databases of words and/or phrases based on analysis of one or more bodies of text, wherein a field is a field of study, discipline, field of research, type of profession, and/or news topic, wherein a database in the plurality of databases has a record for each word and/or phrase in the database, wherein each record includes at least one synonym for the word or phrase, and wherein each record also includes a rarity score and/or vocabulary level for the word or phrase;

receiving a written assignment submitted by a student;

scanning the assignment to identify words and/or phrases in the assignment;

using machine-learning to (a) identify the field of the assignment, (b) select a database specific to the field of the assignment, and (c) adjust the rarity scores of words and/or phrases in the database based on the frequency of words and/or phrases identified in the assignment;

assigning rarity scores and/or vocabulary levels from the database to the words and/or phrases in the assignment;

selecting key words and/or phrases from among the identified words and/or phrases, wherein the key words and/or phrases have high rarity scores and/or vocabulary levels in the selected database; and creating a test to be taken by the student which measures the student's understanding of the key words and/or phrases, wherein the test asks the student to match each key word and/or phrase with a synonym for the key word and/or phrase, wherein a lower percentage of correct answers on the test indicates a higher probability that the student used AI to generate the assignment.

* * * * *